United States Patent
Oliver et al.

(10) Patent No.: US 6,527,093 B2
(45) Date of Patent: Mar. 4, 2003

(54) PRESSURE CONTROLLED SUSPENSION DAMPER

(75) Inventors: Michael L. Oliver, Xenia, OH (US); William C. Kruckemeyer, Beavercreek, OH (US); Troy A. Miller, Xenia, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/780,276

(22) Filed: Feb. 9, 2001

(65) Prior Publication Data

US 2002/0108827 A1 Aug. 15, 2002

(51) Int. Cl.[7] .................................................. F16F 9/54
(52) U.S. Cl. ..................................... 188/322.2; 188/315
(58) Field of Search ....................... 280/6.159, 124.159, 280/124.16, 124.161, FOR 171; 188/313, 314, 315, 322.2

(56) References Cited

U.S. PATENT DOCUMENTS

| | | | | |
|---|---|---|---|---|
| 3,246,905 A | * | 4/1966 | Morgan et al. .......... | 188/282.6 |
| 5,163,538 A | * | 11/1992 | Derr et al. ............... | 188/266.6 |
| 5,392,885 A | * | 2/1995 | Patzenhauer et al. .... | 188/266.6 |
| 5,924,528 A | * | 7/1999 | Vermolen et al. ........ | 188/266.1 |
| 6,161,662 A | * | 12/2000 | Johnston et al. ......... | 188/282.3 |
| 6,182,687 B1 | * | 2/2001 | Forster et al. ........... | 188/299.1 |

* cited by examiner

*Primary Examiner*—Jack Lavinder
*Assistant Examiner*—Robert A. Siconolfi

(57) ABSTRACT

A vibration damper for a vehicle suspension system includes a pumping cylinder concentrically aligned inside a housing defining a pumping chamber having a piston stroking therein for reducing the level of vehicle vibration. An intermediate cylinder defines an intermediate chamber with the pumping cylinder and an outer chamber with the housing. Suspension fluid flows throughout each of the chambers. A valve is operably connected to an air supply of a suspension system having an air pressure relative to a mass loaded on the vehicle. The controls the distribution of fluid between the chambers relative to the pressure of the air supply and controls the amount of vibration damping inside the pumping chamber relative to the mass loaded on the vehicle.

25 Claims, 4 Drawing Sheets

PRESSURE CONTROLLED SUSPENSION DAMPER

TECHNICAL FIELD

The subject invention relates generally to an improved damper assembly for a motor vehicle. More specifically, the subject invention relates to an adjustable damper for a motor vehicle.

BACKGROUND OF THE INVENTION

Suspension dampers are used in combination with vehicle suspension systems to reduce the amount of vibration transmitted through a motor vehicle from such variables as, for example, potholes, rough road surfaces, and unbalanced tires. These dampers are typically adjusted to meet the requirements of a particular mass of the vehicle. Often, the vehicle will be used to transport a load that will significantly increase the mass being supported by the suspension system. This adversely affects the damping properties of the suspension damper as is evident by increased amounts of vibration transmitted through a vehicle when a heavy load is being transported.

A typical suspension damper includes a housing with a pumping cylinder axially aligned inside the housing defining a pumping chamber. A piston and rod is located in the pumping cylinder so that the piston moves in relation to movements or vibrations in the suspension system. Damping fluid fills the pumping cylinder around the piston and partially fills the area between the housing and the pumping cylinder, which acts as a reservoir. A barrier (or base valve) is located at the end of the pumping cylinder away from the rod that separates the interior of the pumping cylinder from the area between the pumping cylinder and the housing. The piston and the barrier are equipped with a system of valves and orifices such that when the suspension damper is reacting to a suspension move, damping fluid is forced to flow through these valves and orifices. The resistance of the damping fluid to flow through the valves and orifices causes the suspension damper to generate a force resisting the movement of the suspension, thus damping the movement. The damping characteristics of this type of damper, as described, are generally non-adjustable after being manufactured.

The valves and orifices used to control a suspension damper of this type are setup so that both the piston and base valve have some damping control during a compression stroke and an extension (rebound) stroke of the damper. However, during a compression stroke, most of the damping restriction is in the base valve, and during a rebound stroke, most of the damping restriction is in the piston. During a compression stroke, as the rod is pressed into the area of the pumping cylinder, damping fluid is forced through the base valve into the reservoir area and through the piston in a direction away from the base valve. During a rebound stroke, damping fluid is forced through the piston in a direction toward the base valve and is drawn into the pumping cylinder, from the reservoir, through the base valve. It should be noted that in both cases, most damping control exerted by these valves is applied to damping fluid flowing in a direction toward the base valve and to the reservoir.

One method used to provide external control to this type of damper uses an additional axial cylinder to provide an additional damping fluid flow path from a location over the piston and base valve to the reservoir. An externally controllable electric valve and an additional valve and orifice set are positioned to control and damp the additional flow. Working in parallel with the other fixed valve and orifice sets, this allows external control of the suspension damper performance. Electrically controlled systems such as this require separate control systems that add significant cost to a vehicle. It would be desirable to utilize an adjustable damper having an actuation member that does not require a controller to adjust the characteristics of a suspension damper.

SUMMARY OF THE INVENTION

The present invention is a suspension damper assembly for a vehicle suspension system. A pumping cylinder is axially aligned inside a housing and defines a pumping chamber. An intermediate cylinder defines an intermediate chamber with the pumping cylinder and an outer chamber with the housing. Suspension fluid flows in the area between the pumping cylinder and the intermediate cylinder. The area between the intermediate cylinder and the housing functions as a reservoir. A piston strokes inside the pumping chamber damping the vibration derived from the suspension system. A valve controls the distribution of fluid between the chambers thereby controlling the amount of vibration damping inside the pumping chamber.

The valve includes a spring actuated member to restrict the flow of fluid between the outer chamber and the intermediate chamber. A locator system is provided as a means of applying external control to the spring actuated member. The locator system includes a bellows disposed inside an air chamber, such that as pressure inside the air chamber is increased, the bellows constricts or becomes shorter. A projection from the end of the bellows extends out of the air chamber and contacts the spring actuated member, acting against the spring. When pressure in the air chamber is relatively high, the bellows is constricted and the bellows projection is withdrawn allowing the spring actuated member spring to locate the valve member to restrict flow. When the pressure in the air chamber is reduced, the bellows expands correspondingly. The bellows projection, working against the spring, moves the valve member and allows increased flow. By increasing the amount of flow to the intermediate chamber, the overall level of damping provided by the suspension damper is reduced. Connecting this device, as shown, to an air leveling system could provide damping control corresponding to vehicle load.

The present invention adjusts the damping properties of the suspension damper without utilizing a controller or a sophisticated electrical valve. This type of system could be applied such that air pressure, used in some suspensions to maintain vehicle attitude under varying loads, could be used to automatically adjust suspension damping, again compensating for the vehicle load. The simple mechanical concept utilizing air pressure from the suspension system is lest costly and more durable than the prior art electric and pneumatic designs.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
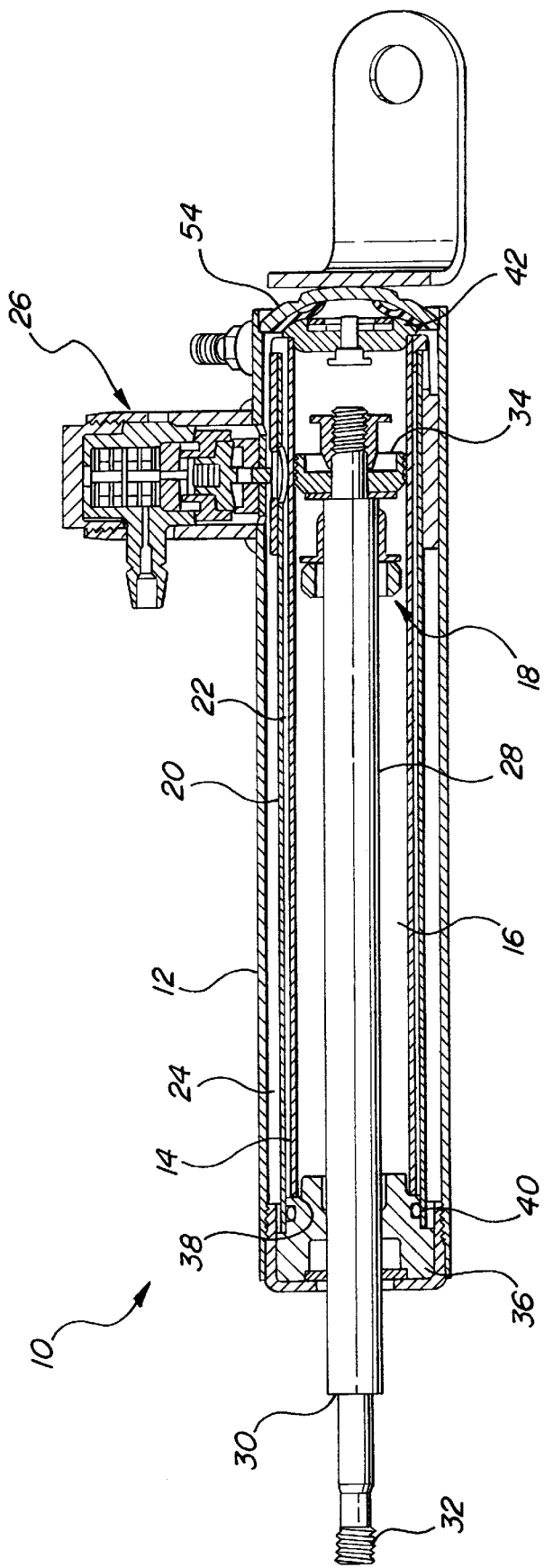
FIG. 1 is a cross-sectional view of the inventive damper.

Referring to FIG. 1, a damper assembly is generally shown at 10. The damper assembly includes a housing 12 and a pumping cylinder 14 concentrically aligned inside the housing 12. The pumping cylinder 14 defines a pumping chamber 16 having a piston 18 slidably disposed therein. An intermediate cylinder 20 defines an intermediate chamber 22 with the pumping cylinder 14 and an outer chamber 24 with the housing 12. A valve 26 is affixed to the housing 12 and controls the distribution of fluid between each of the chambers 16, 22, 24.

The piston 18 is affixed to a piston shaft 28 having a distal end 30 projecting outwardly of the housing 12. The distal end 30 includes a coupling 32 that attaches to the suspension system (not shown) of the vehicle. The piston 18 includes piston valving 34 that resists the flow of fluid when the piston shaft 28 is being stroked outwardly of the housing 12 by the suspension system. The piston valve 34 opens when the piston shaft 28 is being forced into the housing 12 providing little or no resistance to the flow of fluid through the piston 18.

The piston shaft 28 is slidably inserted through a fluid cap 36. The cap includes a notch 38 allowing a free flow of fluid between the intermediate chamber 22 and the pumping chamber 16. A seal 40 prevents the flow of fluid from the outer chamber 24 into either the intermediate chamber 22 or the pumping chamber 16.

Figure 2:
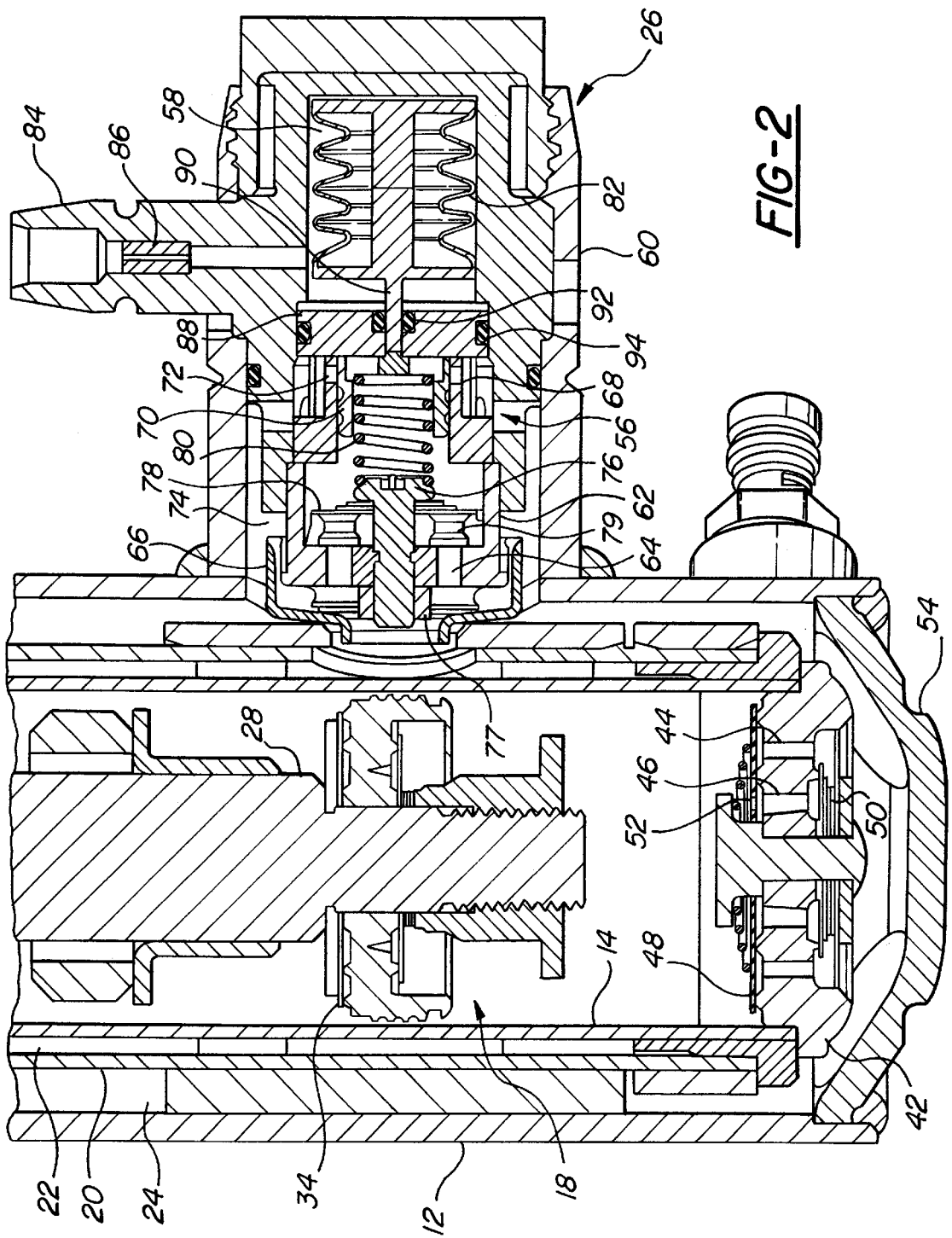
FIG. 2 is a sectional view showing the inventive valve of the subject invention showing the spring actuated member in closed position.
Figure 3:
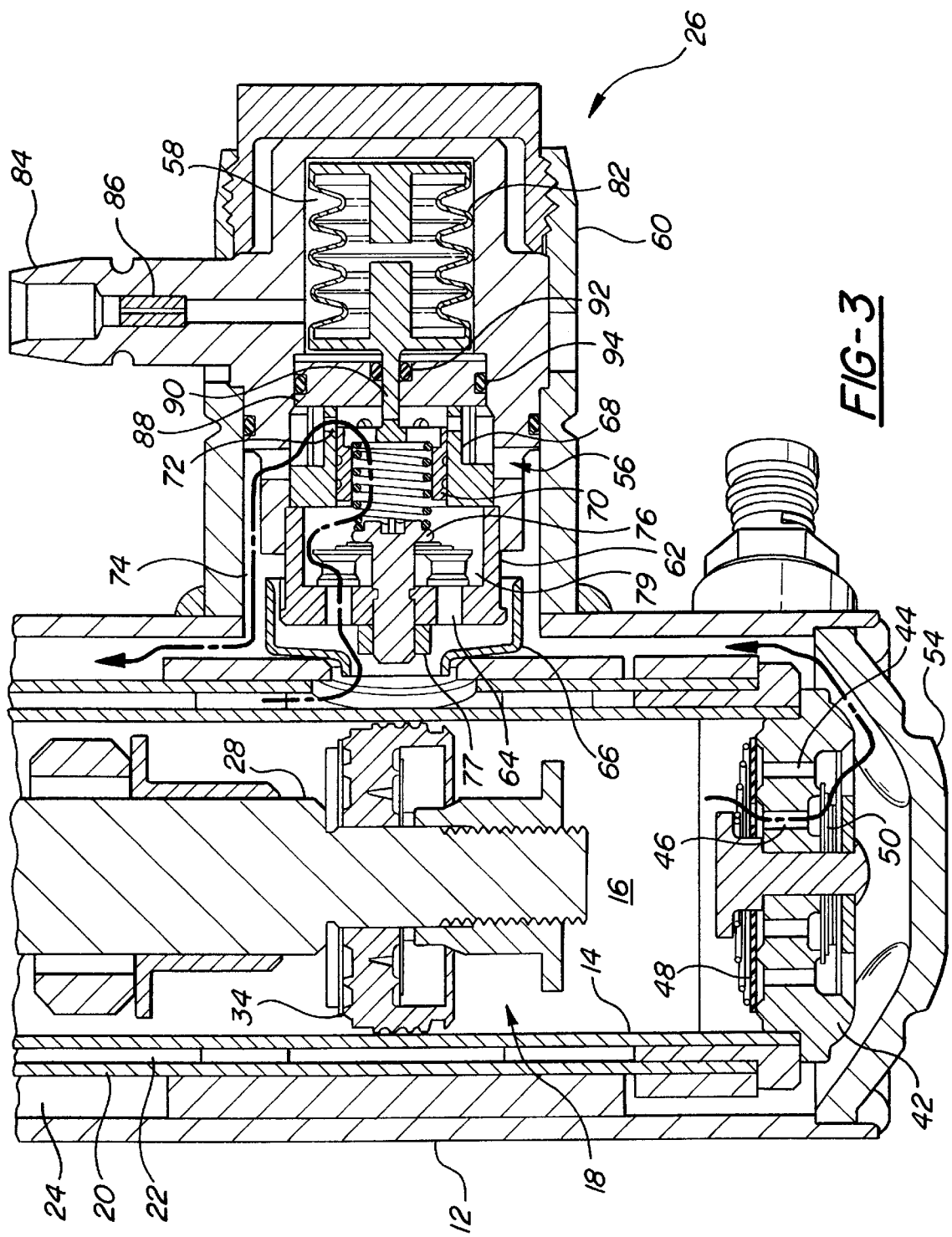
FIG. 3 is a sectional view showing the inventive valve of the subject invention showing the spring actuated member in open position.
Figure 4:
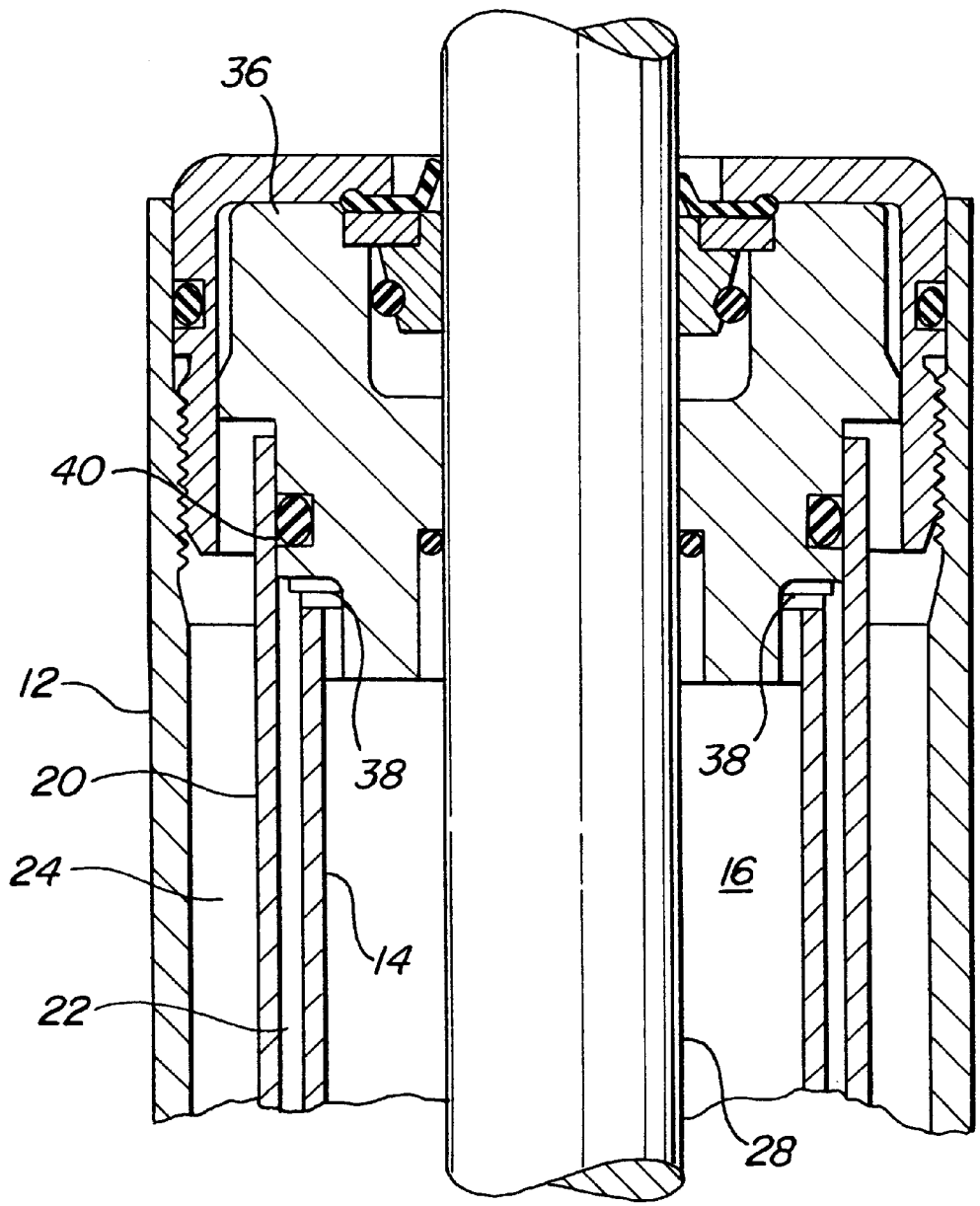
FIG. 4 is a sectional view of the inventive damper showing the fluid cap.

A flow cap 42 is disposed at an opposite end of the housing from the fluid cap 36. As best seen in FIGS. 2 and 3, the flow cap includes an inlet channel 44 and an outlet channel 46. A valving stack 48 and spring 49 abuts the flow cap 42 inside the pumping chamber 16. The valving stack 48 allows fluid flow in the outlet channel 46 and seals outward flow from the pumping chamber 16 through the inlet channel 44 while allowing flow into the pumping chamber 16 through the inlet channel 44. Therefore, fluid can flow through the inlet channel 44 into the pumping chamber 16 with very little resistance. An outlet valving stack 50 is disposed at the opposite end of the outlet channel 46 from the inlet valving stack 48. An inlet valving stack aperture 52 allows fluid from the pumping chamber 16 to enter the outlet channel 46. Under enough pressure, the outlet valving stack 50 can be flexed allowing fluid to leave the pumping chamber 16 through the outlet channel 46. A bracket cap 54 covers the flow cap 42 and seals to the housing 12. The bracket cap 54 allows fluid from the outer chamber 24 to surround the flow cap 42. Therefore, fluid from the outer chamber 24 can enter the pumping chamber 16 through the inlet channel 44, and fluid from the pumping chamber 16 can enter the outer chamber 24 through the outlet channel 46. Accordingly, when the piston shaft 28 is being driven into the housing 12, the piston 18 forces fluid through the outlet channel 46 and into the outer chamber 24. When the piston shaft 28 is telescoped outwardly of the housing 12 fluid will be drawn through the inlet channel 44 from the outer chamber 24.

The valve includes a spring actuated member 56 and an air chamber 58. A casing 60 surrounds the valve 26 securing the valve 26 to the housing 12. The spring actuated members 56 includes a valve cap 62 having at least one valve cap aperture 64 disposed therein. A funnel 66 channels fluid from the intermediate chamber 22 into the spring actuated member 56. The funnel 66 seals to the valve cap 62 thereby preventing fluid from leaking from the intermediate chamber 22 into the outer chamber 24 without having passed through the entirety of the spring actuated member 56.

The spring actuated member 56 includes a sleeve 68 having a spool 70 slidably disposed therein. The sleeve 68 includes at least one sleeve aperture 72 allowing fluid to exit the spring actuated member 56 therethrough. The sleeve aperture 72 leads to a gap 74 formed between the casing 60 and the valve 26. The gap 74 opens into the outer chamber 24. Accordingly, a fluid path exists starting from the intermediate chamber 22 proceeding through the funnel 66, through the valve cap aperture 64, into the spring actuated member 56 through the sleeve aperture 72, into the gap 74, and into the outer chamber 24 (shown in FIG. 3).

A fastener 76 and nut 77 secure a deflector disk 78 over the valve cap aperture 64. A channel disk 79 is disposed between the deflector disk 78 and the valve cap 62 for channeling fluid through the valve cap apertures 64. The deflection disk 78 flexes allowing fluid to enter the spring actuated member 56 from the intermediate chamber 22 and returns to original position to prevent fluid from leaving the spring actuated member 56 in the reverse direction. A spring 80 is supported by the fastener 76 and is received by the underside of the spool 70. The spring 80 biases the spool 70 for closing the sleeve apertures 72.

A bellows 82 is disposed inside the air chamber 58. The bellows 82 contracts when air pressure increases and expands when air pressure decreases. A nozzle 84 connects the air chamber 58 to an air supply, typically of a vehicle suspension system. When the vehicle is under a heavy load, the suspension system is compressed increasing the pressure in the air supply. The increased pressure is transferred to the air chamber 58 via the nozzle 84. When the vehicle is subjected to a light load, the air supply for the suspension system has a lower pressure reducing the pressure in the air chamber 58. A flow regulator 86 is inserted into the nozzle 84 for reducing pressure spikes in the air chamber 58 resulting from a rough road surface. A seal disk 88 separates the air chamber 58 from the spring actuated member 56. The bellows 82 includes a pin 90 that is slidably inserted through the seal disk 88. A pin seal 92 seals the pin 90 to the seal disk 88. A valve seal 94 seals the seal disk 88 to the valve 26.

The pin 90 engages the spool 70 providing a counter-biasing force to the spring 80. When the air supply increases the air pressure in the air chamber 58, the bellows 82 contracts drawing the pin 90 away from the spool 70 allowing the spool 70 to move inwardly under the force of the spring 80 thereby closing the sleeve aperture 72. When the air supply reduces air pressure in the air chamber, the bellows 82 expands forcing the pin 90 outwardly against the spool 70 forcing the spool 70 away from the sleeve apertures 72. As will now be explained, the amount of damping provided by the damper assembly 10 is automatically adjusted according to the load the vehicle is carrying due to the contraction and expansion of the bellows 82 from the air pressure in the suspension air supply.

When the vehicle is under a heavy load, it is desirable to have a more firm damping feel from the suspension system. Under the heavier load, the spring actuated member 56 is sealed preventing the flow of fluid through the valve 26. Therefore, when the piston shaft 28 is forced into the housing 12, fluid will be forced out of the pumping chamber 16 through the flow cap 42 and into the outer chamber 24. As fluid leaves the pumping chamber 16 the pressure begins to drop drawing fluid from the intermediate chamber 22. Because the spring actuated member 56 is closed, fluid will only be drawn from the intermediate chamber 22 into the pumping chamber 16 and not from the outer chamber 24. Further, fluid is not drawn from the intermediate chamber 22 into the outer chamber 24. Therefore, a high fluid pressure is maintained in the pumping chamber 16 providing a firm vibration damping feel to the vehicle.

When the vehicle is transporting a light load, the air supply from the suspension system transfers a low air pressure to the air chamber 58 allowing the bellows 82 to force the spool 70 downward opening the sleeve apertures 72 resulting in a change of the fluid flow throughout the assembly 10. As shown in FIG. 3, Fluid is now drawn from the intermediate chamber 22 through the valve 26 and into the outer chamber 24. This fluid flow pattern reduces the pressure in the intermediate chamber 22 thereby drawing fluid from the pumping chamber 16 through the notch 38. This reduces the amount of fluid in the pumping chamber 16 giving the vibration damper a softer feel. The piston 18 still forces fluid into and out of the pumping chamber 16 through the flow cap 42 as is explained above.

The amount of vibration damping provided by the damper assembly 10 is adjusted according to the load on the vehicle. Various levels of vibration damping are provided by the damper assembly 10 with the pressure in the air supply of the suspension system, which is determined by the load on the vehicle assembly. Therefore, the damper assembly 10 is self-adjusting and operates without the assistance of any vehicle electronics.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A suspension damper assembly for a vehicle suspension system comprising:
   a housing;
   a pumping cylinder axially aligned inside said housing defining a pumping chamber having a piston stroking therein;
   an intermediate cylinder between said housing and said pumping cylinder defining an intermediate chamber with said pumping cylinder and an outer chamber with said housing;
   suspension fluid disposed throughout each of said chambers;
   a valve controlling the distribution of fluid between said chambers thereby controlling the amount of vibration damping inside said pumping chamber, said valve comprising:
      a spring actuated member biased to restrict the flow of fluid between said outer chamber and said intermediate chamber;
      an air chamber coupled to a source of pressurized air;
      a bellows disposed inside said air chamber; and
      a projection from said bellows extending out of said air chamber exerting counter-force upon said spring relative to the air pressure inside said air chamber thereby increasing the amount of fluid flowing between said outer chamber and said intermediate chamber.

2. An assembly as set forth in claim 1 wherein said air source comprises air from an air suspension system.

3. An assembly as set forth in claim 2 wherein said assembly includes a casing forming a fluid return passage around said housing connecting said spring actuated member to said outer chamber.

4. An assembly as set forth in claim 3 wherein said valve includes a valve cap assembly having at least one aperture allowing fluid to flow between said intermediate chamber and said spring actuated member.

5. A suspension damper assembly for a vehicle suspension system comprising:
   a housing;
   a pumping cylinder axially aligned inside said housing defining a pumping chamber having a piston stroking therein;
   an intermediate cylinder defining an intermediate chamber with said pumping cylinder and an outer chamber with said housing;
   suspension fluid disposed throughout each of said chambers;
   a valve controlling the distribution of fluid between said chambers thereby controlling the amount of vibration damping inside said pumping chamber, said valve comprising:
      a spring actuated member biased to restrict the flow of fluid between said outer chamber and said intermediate chamber;
      an air chamber coupled to a source of pressurized air;
      a bellows disposed inside said air chamber exerting counter-force upon said spring relative to the air pressure inside said air chamber thereby increasing the amount of fluid flowing between said outer chamber and said intermediate chamber;
      said air source comprises air from an air suspension system;
      said assembly includes a casing forming a fluid return passage around said housing connecting said spring actuated member to said outer chamber;
      said valve includes a valve cap assembly having at least one aperture allowing fluid to flow between said intermediate chamber and said spring actuated member; and
      said cap assembly includes a one way valve moveable to allow fluid to flow into said spring actuated member from said intermediate chamber.

6. An assembly as set forth in claim 5 wherein said housing includes at least one housing aperture allowing fluid to flow between said spring actuated member and said return passage.

7. An assembly as set forth in claim 6 wherein said spring actuated member includes a sleeve having a plurality of sleeve apertures communicating with said at least one housing aperture and a spool slideably disposed within said sleeve.

8. An assembly as set forth in claim 7 wherein said spool receives said spring, said spring biasing said spool to close said sleeve apertures thereby restricting the flow of fluid from said intermediate chamber to said outer chamber.

9. An assembly as set forth in claim 8 wherein said valve includes a seal plate sealing said spring actuated member from said air chamber.

10. An assembly as set forth in claim 9 wherein said bellows includes a pin slideably inserted through said seal plate and abutting said spool for providing a counter bias upon said spool from said spring.

11. An assembly as set forth in claim 1 wherein said bellows contracts as pressure increases in said air chamber thereby reducing the amount of counter bias upon said spool.

12. An assembly as set forth in claim 11 wherein said bellows expands as pressure decreases thereby increasing the amount of counter bias upon said spool.

13. An assembly as set forth in claim 11 wherein the pressure in said air chamber is proportional to the mass of the vehicle.

14. A suspension damper assembly for a vehicle suspension system having an air supply with an air pressure being relative to a mass loaded on the vehicle comprising:
   a housing;
   a pumping cylinder concentrically aligned inside said housing defining a pumping chamber having a piston stroking therein for reducing the level of vehicle vibration;
   an intermediate cylinder defining an intermediate chamber with said pumping cylinder and an outer chamber with said housing;
   suspension fluid disposed throughout each of said chambers;
   a valve operably connected to said air supply of said suspension system thereby controlling the distribution of fluid between said chambers relative to the pressure of the air supply and controlling the amount of vibration damping inside said pumping chamber relative to the mass loaded on the vehicle;
   wherein said valve comprising:
      a spring actuated member biased to restrict the flow of fluid between said outer chamber and said inner chamber;
      an air chamber operably connected to said air supply;
      a bellows disposed inside said air chamber; and
      a projection from said bellows extending out of said air chamber exerting counter biasing force upon said spring actuated member relative to the air pressure inside said air chamber thereby increasing the amount of fluid flowing between said outer chamber and said interm ediate chamber.

15. An assembly as set forth in claim 14 wherein said assembly includes a casing forming a fluid return passage around said housing connecting said spring actuated member to said outer chamber.

16. An assembly as set forth in claim 15 wherein said valve includes a valve cap assembly having at least one aperture allowing fluid to flow between said intermediate chamber and said spring actuated member.

17. A suspension damper assembly for a vehicle suspension system having an air supply with an air pressure being relative to a mass loaded on the vehicle comprising:
   a housing;
   a pumping cylinder concentrically aligned inside said housing defining a pumping chamber having a piston stroking therein for reducing the level of vehicle vibration;
   an intermediate cylinder defining an intermediate chamber with said pumping cylinder and an outer chamber with said housing;
   suspension fluid disposed throughout each of said chambers;
   a valve operably connected to said air supply of said suspension system thereby controlling the distribution of fluid between said chambers relative to the pressure of the air supply and controlling the amount of vibration damping inside said pumping chamber relative to the mass loaded on the vehicle;
   said valve includes a spring actuated member biased to restrict the flow of fluid between said outer chamber and said inner chamber;
   said valve includes an air chamber operably connected to said air supply;
   said valve includes a bellows disposed inside said air chamber exerting counter biasing force upon said spring actuated member relative to the air pressure inside said air chamber thereby increasing the amount of fluid flowing between said outer chamber and said intermediate chamber;
   said assembly includes a casing forming a fluid return passage around said housing connecting said spring actuated member to said outer chamber;
   said valve includes a valve cap assembly having at least one aperture allowing fluid to flow between said intermediate chamber and said spring actuated member; and
   said cap assembly includes an one way valve moveable to allow fluid to flow into said spring actuated member from said intermediate chamber.

18. An assembly as set forth in claim 17 wherein said housing includes at least one housing aperture allowing fluid to flow between said spring actuated member and said return passage.

19. An assembly as set forth in claim 18 wherein said spring actuated member includes a sleeve having a plurality of sleeve apertures communicating with said at least one housing aperture and a spool slideably disposed within said sleeve.

20. An assembly as set forth in claim 19 wherein said spool receives said spring, said spring biasing said spool to close said sleeve apertures thereby restricting the flow of fluid from said intermediate chamber to said outer chamber.

21. An assembly as set forth in claim 20 wherein said valve includes a seal plate sealing said spring actuated member from said air chamber.

22. An assembly as set forth in claim 21 wherein said bellows includes a pin slideably inserted through said seal plate and abutting said spool for providing a counter bias upon said spool from said spring.

23. An assembly as set forth in claim 22 wherein said bellows contracts as pressure increases in said air chamber thereby reducing the amount of counter bias upon said spool.

24. An assembly as set forth in claim 23 wherein said bellows expands as pressure decreases thereby increasing the amount of counter bias upon said spool.

25. A suspension damper assembly for a vehicle suspension system comprising:
   a housing;
   a pumping cylinder axially aligned inside said housing defining a pumping chamber having a piston stroking therein;
   an intermediate cylinder between said housing and said pumping cylinder defining an intermediate chamber with said pumping cylinder and an outer chamber with said housing;
   suspension fluid disposed throughout each of said chambers;
   a valve controlling the distribution of fluid between said chambers thereby controlling the amount of vibration damping inside said pumping chamber;
   wherein said valve comprising:
      a spring actuated member biased to restrict the flow of fluid between said outer chamber and said intermediate chamber;

an air chamber coupled to a source of pressurized air;
a bellows disposed inside said air chamber; and
a projection from said bellows extending out of said air chamber exerting counter-force upon said spring relative to the air pressure inside said air chamber thereby increasing the amount of fluid flowing between said outer chamber and said intermediate chamber.

* * * * *